United States Patent [19]
Boekelman

[11] 4,034,739
[45] July 12, 1977

[54] FIELD SANITIZING APPARATUS

[76] Inventor: Leonard Boekelman, 2689 Everett, North Bend, Oreg. 97459

[21] Appl. No.: 611,193

[22] Filed: Sept. 8, 1975

[51] Int. Cl.$^2$ .................................. F23C 5/00
[52] U.S. Cl. .................. 126/271.2 A; 37/13; 43/144; 47/1.42; 47/1.44; 239/131; 239/133; 432/227
[58] Field of Search ............... 126/271.1, 271.2 A, 126/271.2 C; 37/12, 13; 43/144; 239/130, 131, 133, 134; 431/DIG. 12; 432/226, 227; 47/1.42, 1.44; 61/36 A

[56] References Cited

U.S. PATENT DOCUMENTS

| | | | |
|---|---|---|---|
| 1,571,883 | 2/1926 | Belanger | 126/271.2 A |
| 1,709,270 | 4/1929 | Lang | 126/271.2 C |
| 2,370,008 | 2/1945 | Christenson | 431/DIG. 12 |
| 3,279,458 | 10/1966 | Moench | 126/271.2 A |

*Primary Examiner*—Ronald C. Capossela
*Attorney, Agent, or Firm*—James D. Givnan, Jr.

[57] ABSTRACT

A chassis having a walking beam undercarriage suspends a carrier in an adjustable manner. The carrier is confined for vertical travel by chassis mounted guides and serves to carry a series of liner members defining multiple burning chambers. Each chamber is served by a low pressure oil burner and exhausts a heat flow downwardly against the passing ground surface. The liner members are detachably mounted by knock-out pins for purposes of periodic servicing the carrier. Repositionable wheel assemblies on the walking beam undercarriage permit travel of the chassis in one direction during operation and lengthwise travel for passage over roadways.

3 Claims, 5 Drawing Figures

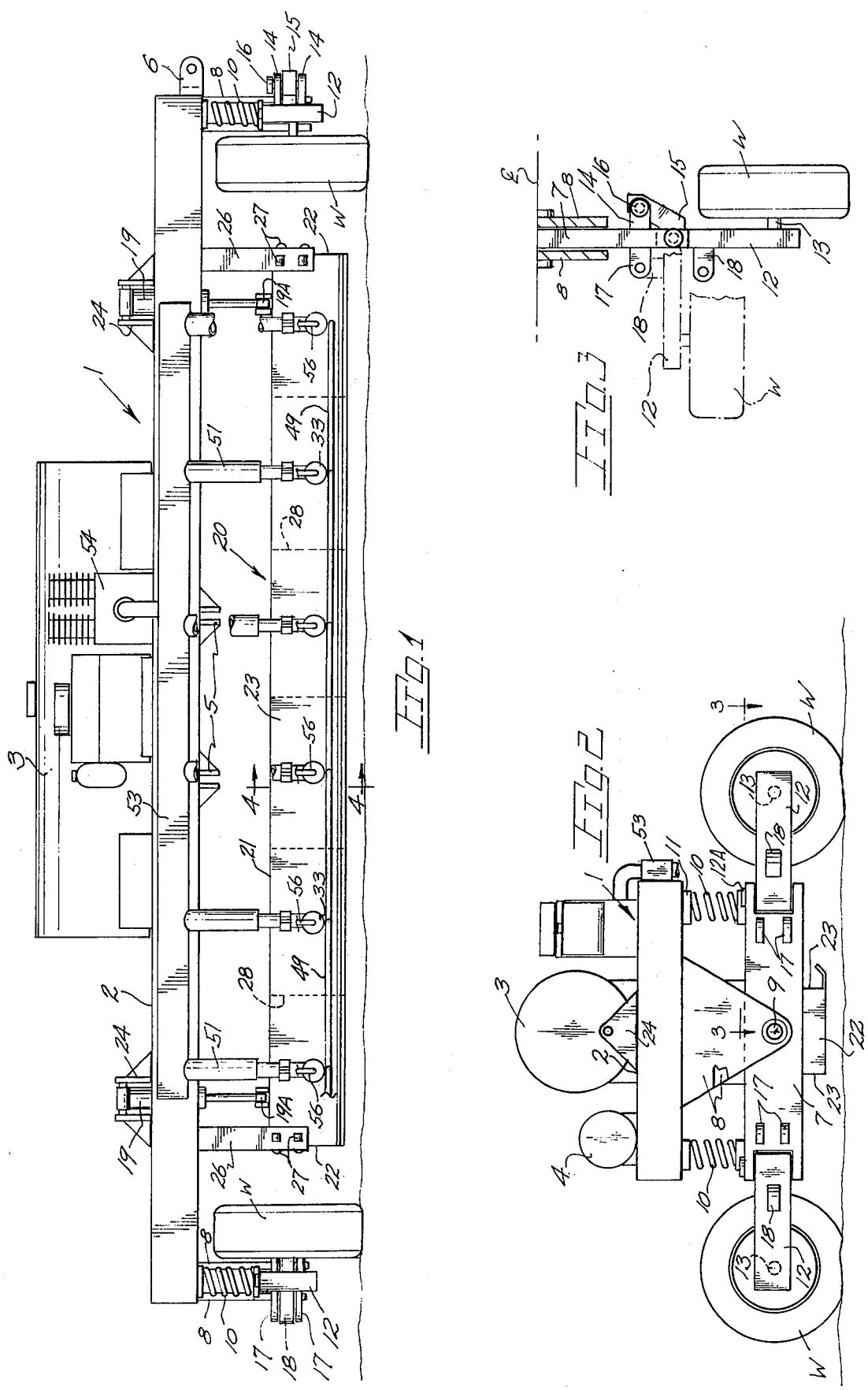

FIELD SANITIZING APPARATUS

BACKGROUND OF THE INVENTION

The present invention relates generally to that class of machines having as their function the application of heat to the ground surface such as for agricultural purposes. Such equipment is wheel-supported for traversing a field thereby momentarily subjecting the ground surface to elevated temperatures to rid the ground of harmful bacterial and other organisms. Common practice by the growers of certain crops such as rye grass is the annual burning of the remaining field stubble after harvest. For many years open burning of the fields has been practiced, however public opposition to the resulting air pollution has resulted in legislation restricting and, in some instances, setting cut-off dates for such open field burning. Air pollution resulting from such burning can be severe depending on local atmospheric conditions.

In anticipation of a strict ban on open field burning, numerous efforts have been made to provide mobile field burners which ignite vegetation and, more importantly, subject the ground surface and soil to elevated temperatures adequate to kill objectionable bacteria which, if left, would jeopardize the following year's crop. Substantial problems in the development of field burning equipment have been encountered by reason of the following factors. For practical reasons the field burner must be of a size and speed to burn several acres per hour with the quantity of stubble per acre being such that severe temperatures are encountered by the burner structure. Further, to prevent escape of flames the burning must be completed during passage of the burner over the ground area being treated otherwise the open flame will ignite adjacent open field areas. Previous field burners have directly ignited the stubble with the burning completed prior to departure of the moving field burner away from the ignited stubble. Obviously the heat generated is substantial requiring most of the prior art structures to include non-metallic insulation which is susceptible to degradation by heat and shock loads, the latter caused by the uneven terrain over which the burners must travel. Sudden loads imparted to the heated burner structures can cause early structural failures. Still further the practicalities of field burning necessitated the prior apparatus being of substantial size which hindered their mobility from one burning site to another.

SUMMARY OF THE PRESENT INVENTION

The present invention is embodied within a wheel-supported apparatus for traversing field terrain while subjecting the terrain to a momentary application of heat sufficient to rid the ground surface of bacteria and other objectionable organisms. Obviously other applications of the invention may be feasible beyond agricultural purposes.

An elongate carrier is suspended from a wheel-supported chassis, the carrier provided with multiple burning chambers each having a durable liner into which a flame is directed. The chambers, accordingly, are heated to very high temperatures resulting in heat being discharged downwardly therefrom to impinge against the ground surface. The carrier is supported by adjustable means enabling the chambers to be positioned into close proximity with the ground surface for desired results. The liners, defining each burning chamber, are durable and, further, lend themselves to convenient, low cost replacement after long periods of use. Individual low pressure oil burners supply each chamber with a continuous oil-fired flame. Insulation is confined intermediate the walls of the liner and the surrounding carrier wall to prevent heat damage to said carrier. Further, provision is made for supplementing the insulation from time to time.

The chassis is supported by pairs of flotation type tires, each tire being mounted on a walking beam in a manner permitting repositioning of a wheel through ninety degrees for purposes of roadway travel. While, concept of repositioning wheels of agricultural equipment for roadway travel is old, the use of same in conjuction with a walking beam undercarriage is not known. Compression springs, intermediate the machine frame and a pair of walking beams, serve to relieve the frame from torsional loads which would otherwise be encountered in traversing uneven terrain. The frame serves to mount both propane and oil tanks providing each burner with a pilot flame gas and with an oil supply. A compressor provides a flow of air to each oil nozzel via a suitable manifold. The oil burners utilized are of the low pressure type enabling the burning of used lubricating oil.

Objects of the present invention include the provision of a field burner capable of imparting high temperatures to the ground surface and the soil immediately therebelow to sanitize same in a brief period of time during passage of each of the multiple burning chambers over the ground; the provision of a field burner having heat-resistant liners defining chambers within which extremely high temperatures are achieved with the liners being replaceable in a convenient manner; the provision of a field burner wherein a vertically adjustable carrier positions a multitude of burning chambers toward and away from a ground surface for optimum heat of said surface; the provision of a field burner having a frame supported at each end by a walking beam which in turn is supported by ground-engaging wheels each of which is positionable through approximately ninety degrees with said walking beam supporting the machine frame in a manner avoiding torsional loading of the frame; the provision of a field burner or sanitizer fueled with used lubrication oil for low cost operation. These and other objects will subsequently become apparent from the following description.

BRIEF DESCRIPTION OF THE DRAWINGS

In the accompanying drawings:

FIG. 1 is a front elevational view of the present field burner configured for field operation, FIG. 2 is a side elevational view taken from the left hand end of the FIG. 1, FIG. 3 is a view taken downwardly along line 3—3 of FIG. 2 showing details of the wheel-mounting arrangement.

DETAILED DESCRIPTION OF THE PREFERRED EMBODIMENTS

Figure 4:
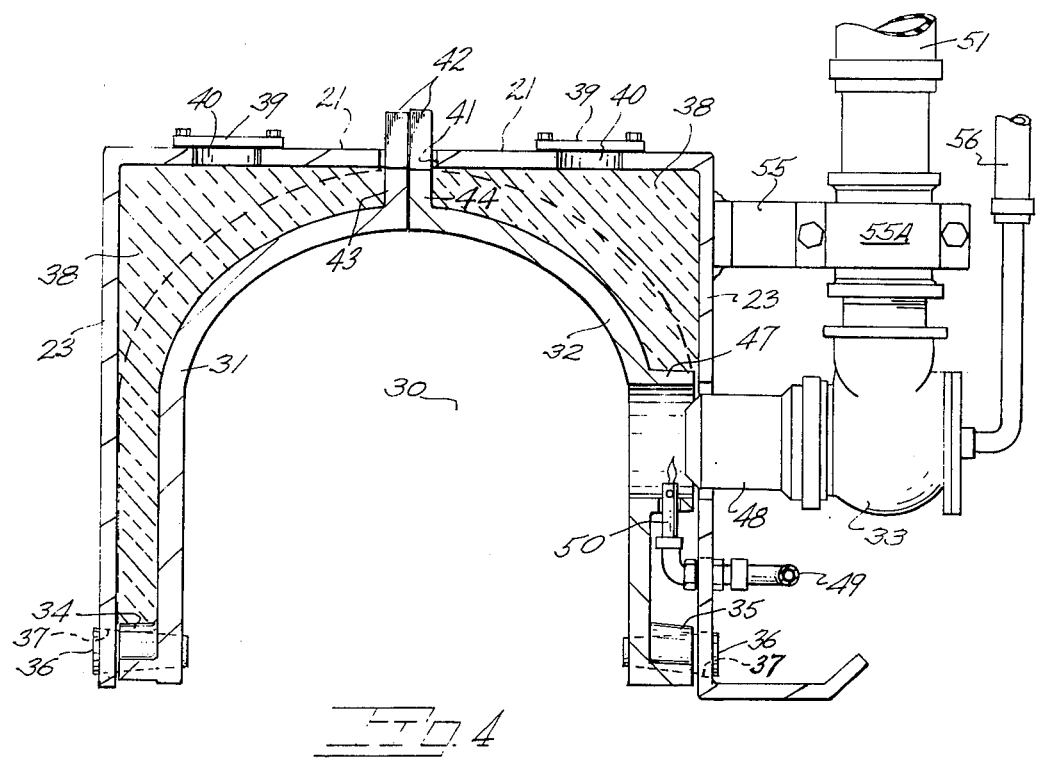
FIG. 4 is a vertical section taken along line 4—4 of FIG. 1 showing details of a burning chamber and supporting carrier.
Figure 5:
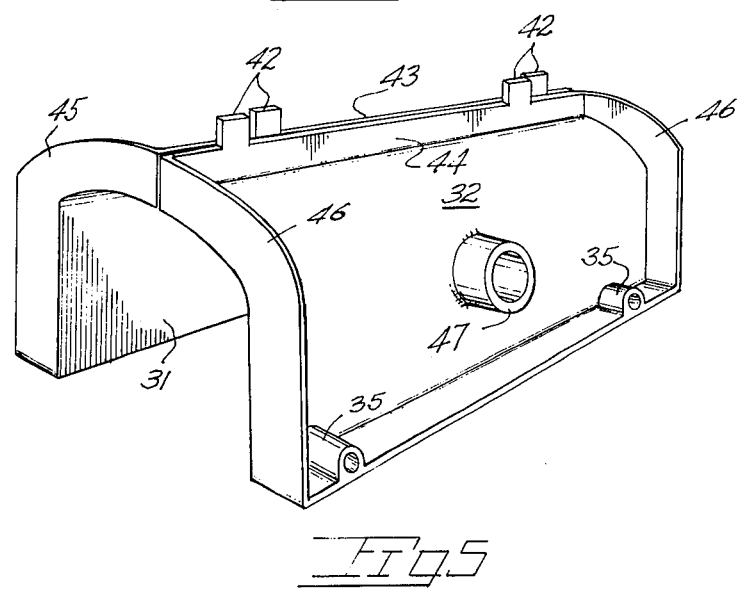
FIG. 5 is a perspective view of a heat resistant liner.

With continuing reference to the accompanying drawings wherein the reference numeral 1 indicates generally a frame or chassis constituting a base of welded beam construction having a deck 2 on which is suitably mounted an oil tank 3 and a fuel tank 4 for propane or other gaseous fuel.

For attachment of a draft vehicle, pairs of clevises are provided at 5 along one edge of the chassis while clevises at 6, along an adjacent edge, are utilized for roadway travel as later explained.

subjacent each end of the chassis is a walking beam undercarriage including a walking beam 7 journalled at its center within a king pin 9 secured with pairs of plate members 8. The chassis is further supported by coil spring members 10 extending intermediate the chassis corners and the outer ends of each walking beam. Spring mounting pads 11, affixed to the chassis and walking beams, retain the spring ends.

Mounted at each walking beam end is a spindle plate 12 having a wheel spindle 13 thereon for the mounting of a flotation tire and wheel assembly W. With attention to FIG 3, a first pair of cooperation ears 14 and 15 have aligned apertures to receive a locking pin 16 to lock spindle plate 12 in alingment with the walking beam for operational or field travel. A second set of ears at 17 and 18 on the walking beam and spindle plate may be aligned to receive locking pin 16 to secure the wheels W repositioned (broken line position) for over-the-road travel. The pins 16 may be removed from the lead pair of wheels to permit castering movement of same about the axis of a king pin at 12A.

Depending from chassis 1 is an elongate carrier structure generally at 20 having closed upper, end and sidewalls at 21, 22 and 23. Hydraulic cylinders 19 impart vertical movement to the carrier at its corners with the cylinder bases supported by weldments 24. The rod end 19A of each cylinder is equipped with a spherical fitting to avoid any alignment problems.

For carrier confinement against lateral movement I provide guides at 26 with friction reducing means such as rollers 27 in each flange of each guide. Other arrangements, besides the angle iron segments shown, to constrain the carrier to a desired path of travel will be readily apparent.

Carrier 20 is of compartmented construction with heat resistant partitions at 28. Within each compartment are mounted domed liner structures preferably of cast iron or other heat resistant metal. The liners are of segmented construction at 31 and 32 (FIG. 4) and define a burning chamber 30 into which a flame is directed from an oil burner assembly 33. For detachable securement of the liners, bosses at 34, 35 receive tapered pins 36 the outer ends of which seat within openings 37 in carrier beam 20. Preferably the pins 36 are of knock-out type for ease of removal from the tapered boss opening. A modified form of liner-carrier attachment may be achieved by casting arm-like projections integral with the liner halves for extension through the carrier sidewalls whereafter pins are inserted through the outer ends of the extensions. The width of the mouth of the cast liner is approximately twelve inches, but of course may be varied in other liner embodiments. Further, while a single carrier 20 is shown and described, a second or additional carriers may be suspended in parallel fashion from chassis 1.

Carrier 20 is protected from severe temperatures by the packing of insulation at 38 intermediate the liner halves and the inner wall surfaces of said carrier. To enable replenishing of the insulation from time to time in the area intermediate the carrier and the liner members access plates at 39 permit the addition of insulation via openings 40. Spaced along the top wall of carrier beam 20 are spaced apart openings 41 of rectangular shape which receive upwardly directed ears 42 integral with each liner. Said ears project upwardly from abutting lengthwise extending flanges 43, 44, the abutting surfaces of which serve to support the liner halves against inward movement. At the ends of the liners 31 and 32 are outwardly extending flanges 45 and 46 which serve to confine the insulation material. An annular projection 47 on liner member 32, serves to receive the nose 48 of an oil burner 33 which is of conventional construction having an unseen nozzle directing mixed fuel and air past a pilot light 50 served by a gas line 49 from tank 4.

With continuing attention again to oil burner 33 the same is served by a pressurized, flexible air conduit 51 from a compressor 54 and manifold 53. A bracket 55 retains the burner in place with a clamp component 55A permitting convenient removal of the oil burner for servicing purposes. An oil line is indicated at 56 and provides a low pressure oil supply to said burner which utilizes a relatively large orifice nozzle permitting the burning of most any type of oil such as reclaimed engine oil. Pilot light 50 is mounted in a removable manner within a slotted opening in carrier side wall 23.

In operation, the chassis is adapted for roadway travel by the repositioning of each of the wheels to a position ninety degrees from that shown in FIGS. 1 and 2. Clevises 6 at the right hand end of the chassis as viewed in FIG. 1 receive draft arms of the towing vehicle while the repositioned wheels permit lengthwise travel of the chassis with its width being well within the maximum width permitted on two-lane roads. Upon arrival at the field sanitizing site, each wheel is swung approximately 90° returning the vehicle to its FIG. 1 configuration. During roadway travel the rear set of wheels (those at the left hand end of FIG. 1) will be locked in accordance with the spindle plate retention structure shown in FIG. 3 while the front wheels (right hand end of FIG. 1) may trail about the axis of king pins 12A.

Prior to commencement of field operation carrier 20 is positioned downwardly toward the ground surface by uniform extension of hydraulic cylinders 19 adjustably supporting the carrier. In a typical field operation the clearance between the lower edge of carrier 20 and the ground surface will be approximately 5 inches. At all times carrier 20 is held against lateral displacement by roll-equipped guides 26. Fuel from oil tank 3 flows via a suitable fuel manifold and lines 56 to each oil burner 33 while similarly a flow of pressurized air from the compressor is provided via manifold 53 and air lines 51 to each burner. Propane tank 4 supplies each of the pilots 50. Accordingly pilot 50 ignites the atomized fuel and combustion supporting air discharged from burner nose 45 resulting in a continuous oil-fired flame extending into the burning chamber. The heat resistant properties of the liner which may be of cast iron are such that extreme temperatures within the burning chamber degrade the liners only after extended operation. The heat flow is exhausted downwardly from each burning chamber for impingement upon the ground surface with the heat being such as to achieve desired ground temperatures for the above-mentioned purposes. The surface area being treated at any one instant is somewhat greater in width than the transverse width of the burning chamber by reason of the fact that the discharge heat flow will migrate to some extent beyond the confines of the liner walls. Liner halves 31 and 32 may be individually replaced, as necessary, simply upon elevation of the carrier 20 and the removal of knock-out pins 36. As earlier mentioned the insulation may be recharged from time to time.

While I have shown but one embodiment of the invention it will be apparent to those skilled in the art that the invention may be embodied still otherwise without departing from the spirit and scope of the invention.

Having thus described the invention what is desired to be secured in a Letters Patent is:

1. A heat generating apparatus for imparting elevated temperatures to the ground and the area immediately there below, said apparatus comprising,
    a wheel supported chassis,
    an elongate carrier of wall construction depending from said chassis and defining pin receiving openings,
    a series of segmented metallic liner members removably mounted in pairs interiorly along the carrier structure and defining multiple downwardly opening burning chambers, said liner members including bosses defining openings for the reception of removable pins interconnecting the liner members to the carrier structure, each pair of liner members additionally including mutually abutting flanges,
    burners for discharging a pressurized fuel-air mixture into each of said burning chambers, and
    pin means coupling a liner member with a wall of said elongate carrier, said pin means in removable engagement with said wall and liner member to permit convenient removal and replacement of a liner member.

2. The apparatus claimed in claim 1 additionally including a walking beam type undercarriage at each end of said chassis, wheel assemblies mounted adjacent the end of each walking beam undercarriage, a pivotal connection between each undercarriage and its respective end of said chassis, yieldable means interposed between each undercarriage and said chassis to maintain the chassis against fore and aft tipping forces acting about the pivotal connections.

3. The apparatus claimed in claim 2 wherein each undercarriage includes spindle plates positionable and lockable through 90° to permit alternative travel of the chassis along perpendicuiarly oriented courses.

* * * * *